(12) United States Patent
Filippini

(10) Patent No.: US 11,046,037 B2
(45) Date of Patent: Jun. 29, 2021

(54) PANEL STRUCTURE WITH FOAM CORE AND METHODS OF MANUFACTURING ARTICLES USING THE PANEL STRUCTURE

(71) Applicant: Gearbox, Inc., San Diego, CA (US)

(72) Inventor: Rafael G. Filippini, San Diego, CA (US)

(73) Assignee: GEARBOX, INC., San Diego, CA (US)

( * ) Notice: Subject to any disclaimer, the term of this patent is extended or adjusted under 35 U.S.C. 154(b) by 0 days.

(21) Appl. No.: 16/520,024

(22) Filed: Jul. 23, 2019

(65) Prior Publication Data

US 2019/0344515 A1 Nov. 14, 2019

Related U.S. Application Data

(63) Continuation of application No. 14/971,011, filed on Dec. 16, 2015, now Pat. No. 10,377,093.

(Continued)

(51) Int. Cl.
*B29C 70/84* (2006.01)
*A63C 17/01* (2006.01)
(Continued)

(52) U.S. Cl.
CPC ............ *B29C 70/84* (2013.01); *A63B 59/40* (2015.10); *A63B 59/42* (2015.10); *A63C 17/01* (2013.01);
(Continued)

(58) Field of Classification Search
CPC . Y10T 428/24744; B29C 70/84; A63C 17/01; A63C 17/015; A63C 17/017;
(Continued)

(56) References Cited

U.S. PATENT DOCUMENTS 3,230,995 A 1/1966 Shannon
3,249,659 A 5/1966 Voelker
(Continued)

FOREIGN PATENT DOCUMENTS

WO 2005040524 A1 5/2005
WO 2007129886 A1 11/2007

OTHER PUBLICATIONS

International Search Report, PCT/US2015/066609, dated May 4, 2016, Korean Intellectual Property Office.
(Continued)

*Primary Examiner* — Frank J Vineis
*Assistant Examiner* — Donald M Flores, Jr.
(74) *Attorney, Agent, or Firm* — Procopio Cory Hargreaves and Savitch LLP

(57) ABSTRACT

A composite panel structure has opposing outer walls or surfaces and a core comprising a plurality of ribs extending between and connected to the outer walls and defining chambers which are filled with expanding foams, non-expanding foams, gases, or a combination thereof. The outer panel surfaces and internal chamber walls or ribs are made of woven or non-woven fibrous material impregnated with one or more resins. The panel structure may be used for making a variety of products including sports equipment such as sports paddles, surfboards, kite boards, skateboards, wakeboards, as well as construction panels for walls, ceilings or floors, display panels, panels for the vehicle industry, furniture, and other structures requiring high strength to weight properties.

18 Claims, 9 Drawing Sheets

Related U.S. Application Data

(60) Provisional application No. 62/100,404, filed on Jan. 6, 2015.

(51) Int. Cl.
| | | |
|---|---|---|
| *B29D 99/00* | (2010.01) | |
| *B32B 5/02* | (2006.01) | |
| *B32B 3/12* | (2006.01) | |
| *B32B 3/26* | (2006.01) | |
| *B32B 3/08* | (2006.01) | |
| *B32B 5/20* | (2006.01) | |
| *B32B 27/12* | (2006.01) | |
| *A63B 59/42* | (2015.01) | |
| *B32B 5/24* | (2006.01) | |
| *B32B 5/26* | (2006.01) | |
| *A63B 59/40* | (2015.01) | |
| *B29K 105/08* | (2006.01) | |
| *B29L 31/52* | (2006.01) | |
| *A63B 102/16* | (2015.01) | |
| *A63B 102/08* | (2015.01) | |
| *A63B 102/20* | (2015.01) | |

(52) U.S. Cl.
CPC .......... *A63C 17/015* (2013.01); *A63C 17/017* (2013.01); *B29D 99/0014* (2013.01); *B32B 3/08* (2013.01); *B32B 3/12* (2013.01); *B32B 3/26* (2013.01); *B32B 3/263* (2013.01); *B32B 5/02* (2013.01); *B32B 5/20* (2013.01); *B32B 5/245* (2013.01); *B32B 5/26* (2013.01); *B32B 27/12* (2013.01); *A63B 2102/08* (2015.10); *A63B 2102/16* (2015.10); *A63B 2102/20* (2015.10); *A63C 17/012* (2013.01); *A63C 2203/42* (2013.01); *B29K 2105/0872* (2013.01); *B29K 2715/003* (2013.01); *B29L 2031/52* (2013.01); *B32B 2250/03* (2013.01); *B32B 2260/021* (2013.01); *B32B 2260/04* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2266/025* (2013.01); *B32B 2266/0214* (2013.01); *B32B 2266/0221* (2013.01); *B32B 2266/0228* (2013.01); *B32B 2266/0278* (2013.01); *B32B 2266/08* (2013.01); *B32B 2266/10* (2016.11); *B32B 2419/04* (2013.01); *B32B 2605/00* (2013.01)

(58) Field of Classification Search
CPC ... A63C 17/012; A63C 2203/42; A63B 59/40; A63B 59/42; A63B 2102/16; A63B 2102/08; A63B 2102/20; A63B 60/00; B32B 5/02; B32B 5/26; B32B 3/12; B32B 3/263; B32B 3/08; B32B 5/20; B32B 5/245; B32B 3/26; B32B 27/12; B32B 2262/101; B32B 2262/106; B32B 2266/0221; B32B 2266/0228; B32B 2266/025; B32B 2266/0278; B32B 2266/08; B32B 2419/04; B32B 2266/10; B32B 2250/03; B32B 2260/021; B32B 2260/046; B32B 2262/10; B32B 2262/0269; B32B 2260/04; B32B 2266/0214; B32B 2605/00; B29D 99/0014; B29K 2715/003; B29K 2105/0872; B29L 2031/52
USPC ...................................... 428/188; 280/87.042
See application file for complete search history.

(56) References Cited

U.S. PATENT DOCUMENTS

| | | | |
|---|---|---|---|
| 3,303,076 A | 2/1967 | Carlson, Jr. et al. | |
| 3,544,417 A | 12/1970 | Corzine | |
| 3,549,449 A | 12/1970 | Windecker | |
| 3,708,380 A | 1/1973 | Niebylski | |
| 3,859,162 A | 1/1975 | Johnson et al. | |
| 4,032,689 A | 6/1977 | Johnson et al. | |
| 4,463,043 A | 7/1984 | Reeves et al. | |
| 4,795,666 A * | 1/1989 | Okada | B29D 99/0007 428/71 |
| 5,182,158 A | 1/1993 | Schaeffer | |
| 5,403,063 A | 4/1995 | Sjostedt et al. | |
| 5,407,195 A | 4/1995 | Tiitola et al. | |
| 5,624,622 A * | 4/1997 | Boyce | B29C 44/569 264/258 |
| 5,679,432 A | 10/1997 | Holmquest et al. | |
| 5,961,404 A | 10/1999 | Gormley | |
| 6,122,785 A * | 9/2000 | Bondie | A42B 3/121 5/655.3 |
| 6,138,580 A | 10/2000 | Thoman | |
| 6,457,237 B1 | 10/2002 | Matthews et al. | |
| 6,805,642 B2 | 10/2004 | Meyer | |
| 6,871,600 B2 | 3/2005 | Norton et al. | |
| 7,077,768 B2 | 7/2006 | Filippini | |
| 7,150,692 B2 | 12/2006 | Hong | |
| 7,867,428 B2 | 1/2011 | Filippini | |
| 8,371,968 B2 | 2/2013 | Gazzara et al. | |
| 8,663,791 B2 | 3/2014 | Day et al. | |
| 2005/0113194 A1 | 5/2005 | Pearson | |
| 2006/0049596 A1* | 3/2006 | Hill | A63C 17/01 280/87.042 |
| 2006/0263575 A1* | 11/2006 | Ritchie | B32B 9/00 428/119 |
| 2008/0246269 A1* | 10/2008 | Cheung | B62B 15/00 280/845 |
| 2008/0293315 A1 | 11/2008 | Yeh | |
| 2015/0001817 A1* | 1/2015 | Imbrie | A63C 17/012 280/11.27 |
| 2016/0107053 A1 | 4/2016 | Pree | |

OTHER PUBLICATIONS

Written Opinion of the International Searching Authority, PCT/US2015/066609, dated May 4, 2016, Korean Intellectual Property Office.

* cited by examiner

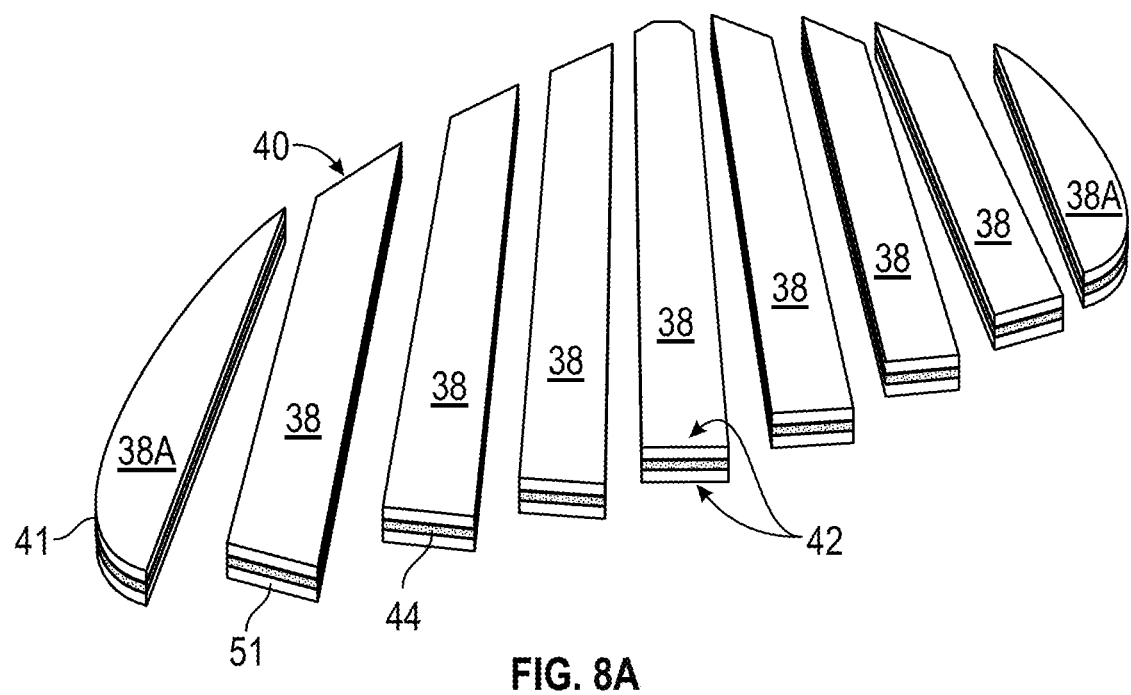
FIG. 8A
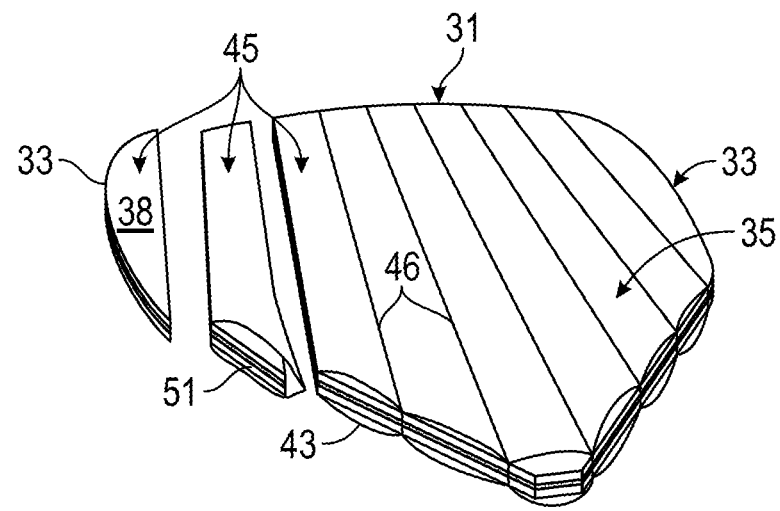
FIG. 8B
FIG. 8C

PANEL STRUCTURE WITH FOAM CORE AND METHODS OF MANUFACTURING ARTICLES USING THE PANEL STRUCTURE

BACKGROUND

Related Field

The subject matter discussed herein relates generally to composite panel materials for use in walls and other articles, and is particularly concerned with a panel structure with a foam core and methods of manufacturing sports products such as paddles, bats, skateboards, wakeboards, surfboards and the like from such panel structures, as well as wall panels, dividers and other articles.

Related Background

Panel materials of various types are known for use in articles such as sports equipment including paddles or bats for use in various ball sports, skis, surfboards, skateboards, wakeboards, and the like, as well as in construction of interior walls, barriers, furniture, room dividers or partitions, vehicle walls and doors, display panels, and the like, all of which require high strength to weight properties.

Sports paddles for use in playing paddleball, pickle ball, table tennis, padel tennis, smashball, and the like include a frame with a head portion. A face surface for the paddle can be made together with the frame or in a multiple step process to create the hitting surface area. The head portion surrounds and defines the hitting area. During play, the face surface is designed to contact and rebound a game piece such as a racquetball, tennis ball, or pickle ball.

Traditionally, the frames of sports paddles were made of wood. More recently, frames and paddles have been made from aluminum core, foam core, honeycomb structure core, and composite materials. In a more traditional wood or aluminum structure, the paddle is made entirely using these materials, which are cut to the desired finished shape. To complete the paddle a handle is then built up using additional wood, aluminum or other materials to increase the circumference of the handle. This process limits the weight to strength ratios as well as the ability to customize weight, balance, and the like. Traditional paddles are made of solid wood, injected plastics, or composite fiber with honeycomb cores. All of these paddles have tremendous disadvantages due to the construction methods and the limits due to the materials and technology. The paddles of today rely on these homogeneous structures that limit the weight distribution and overall weight, leaving them with limited performance characteristics. Further, the more advanced paddles with honeycomb cores are also limited due to how the panel is cut, which leaves the core edges exposed with a gap between the top and bottom surface panels. The gap allows for easy destruction of the paddle, so a plastic cover is normally added around the edges creating a step around the edges which results in a non-uniform edge. As a result, if the ball strikes the edge, it will change direction. Yet another problem with the paddles of today is the handle. The handle is also a buildup of different materials from the surface and requires additional processing to complete. The appearance is a non-esthetic assembly of various pieces. Yet another problem with solid sports paddle construction is the sound produced at ball impact. The core is usually made of an entirely rigid material giving out loud sounds on impact. Cores or other dampening material are not added due to the weight restrictions or difficulties in manufacture.

Solid face hitting areas are often made from wood and aluminum alloy materials. Due to the ease of manufacturing these structures, solid wood or aluminum structures have been used to produce low price, low technological, and mass-production frames. These solid face structures have many limitations, mostly due to the materials and limited use of these materials. The frame and solid face structures cannot be manipulated to increase strength, stiffness, or change the shape of said structures. Additionally, wood and aluminum structures are heavy and lack strength.

Currently, composite frame and face structures are used in paddle manufacture, mostly because of the higher strength-to-weight ratio in composite paddle frame and face construction. Combinations of materials such as carbon, para-aramid fiber, fiberglass, boron, and other fibrous material have been used to manufacture sports paddles in recent years. This can produce paddles that are more rigid, lighter, and larger, thus improving the player's ability and advancing the evolution of each individual sport.

Paddle frames of composite paddles are sometimes produced by bladder molding where a structure is created by using compressed air, chemical reactions to increase pressure, or hot gases to apply internal pressure within the structure, thus forcing the material to the predetermined edges of the rigid mold shape. At the same time, when pressure is added to the structure, the mold and the part is heated to a temperature which that accelerated the catalyst process to harden the structure. Once hardened, usually using thermal set resins, a rough paddle frame structure is created.

The first step in bladder molding is to prepare the part for the molding process. The step is called creating a "pre-shape". A pre-shape is a straight tube structure. The part is shaped and formed later to produce a structure with outer dimensions matching that of the inner mold cavity dimensions. A rigid mandrel is used to create a predetermined shape. A nylon bladder is placed over the mandrel. This nylon bladder is sealed to contain the air, chemical or hot gas pressure. The layup process for the outer frame then begins on the rigid mandrel with the bladder in place.

The lay-up process is the application of multiple plies of carbon, Kevlar, fiberglass, and other synthetic and natural fibrous materials. Once the lay-up is completed, the pre-shape is placed into a mold having a special design. To create paddleball racquets, pickle ball paddles, and other solid face game paddles, an additional step is required to complete the lay-up process. The building of the face or striking surface is a process in which the lay-up of the frame structure and face structure are combined to make a single structure.

The building of the face structure or striking surface requires a combination of carbon, para-aramid synthetic fiber, fiberglass, and other synthetic fibrous materials, usually with a continuous foam core to fill the space between the front striking surface and opposing back striking surface. A gap ranging from ¼" to 2" is common in the building of today's paddles or racquets. The materials used to fill the space between the two surfaces can significantly increase the weight of the paddles, thus requiring reduction of the number of plies used on the frame structure or striking surface. This significantly reduces the overall strength as well as strength to weight ratio of the paddles.

SUMMARY

According to one aspect, a composite panel structure comprises spaced first and second outer layers of material, each layer having an outer surface and an inner surface facing the other layer, a plurality of spaced, parallel ribs extending between inner surfaces of the first and second layers to form a plurality of elongate chambers between the ribs, and a foam material, gas, or a mixture thereof filling each chamber. In one aspect, the outer layers and inner ribs may be of woven or non-woven fibrous material impregnated with resins such as epoxy, polyester, or metal matrix resins. This produces a very strong structure of relatively low weight. The chambers may be filled with expanding foams or gases, non-expanding foams, or a combination thereof. The foam materials may be plastic construction foams or the like.

In one aspect, the first and second layers are of matching size and shape defining an outer periphery and the ribs and foam-filled chambers cover the entire area between the layers up to the outer periphery. The panel structure may be used for any product requiring high strength to weight properties. The multiple connected foam-filled chambers strengthen and stiffen the front surface and back surface of the structure.

The structure can be constructed to meet the demands of a variety of products including panels for various sports products such as paddles, skateboards, wakeboards, surfboards, skis and the like, as well as wall structures, furniture, vehicle panels, and the like. In some aspects, the panel structure is used to manufacture various types of sporting devices requiring high strength and relatively light weight, such as solid paddles or bats as used for pickle ball, paddleball, table tennis, beach paddle, padel, cricket, and other surface paddle games, and other types of sports equipment including surfboards, kite boards, skateboards, wakeboards, and the like. In a sporting paddle for striking a ball or other projectile, the ribs and foam cores may run in a direction from the handle end to the opposite end of the paddle shape.

In other aspects, the panel structure is designed as a rectangular panel for a wall structure, barrier, trade show display, or the like, and is of rectangular shape with opposite side edges, opposite end edges and flat outer surfaces, and the parallel ribs and foam cores extend between the opposite side edges or the opposite end edges. However, the panel structure may be of many different peripheral shapes and dimensions depending on the application and may have contoured outer surfaces in other embodiments. The panel structure may also be used in furniture construction, vehicle construction, or the like.

In another aspect, a method of making a composite panel structure is provided, which comprises creating a plurality of foam cores of predetermined length and shape, wrapping fibers around the periphery of each foam core to form chambers containing the foam cores, joining the chambers together to form a base structure having opposite first and second faces and an outer peripheral edge, and applying a first surface layer to the first face, a second surface layer to the second face, and a peripheral edge layer to form a pre-shape. The pre-shape structure is then placed in a cavity mold or bladder mold and heat is applied to cure the structure.

In one embodiment, the panel surfaces and the internal chamber walls or ribs are created using woven or non-woven fibrous material selected from the following: carbon fiber, glass fiber, graphite, boron, para-aramid synthetic fiber (KEVLAR®), or other fibrous materials. More than one fibrous material may be used in some embodiments. In one embodiment, the fibers were a mixture of carbon fiber, glass fiber, and para-aramid synthetic fiber. The fibrous materials are impregnated with thermoplastic polymers or resins such as epoxy, polyester, polyurethane ketone (PEEK), or metal matrix resins to form a composite fiber material.

In the finished panel, the chambers, ribs, and outer surface layers which are of the same materials are molded together to integrate the entire structure, creating one uniform structure. The method of making the panel structure allows incorporation of variable surface thickness for specific load application or reduced surface thicknesses in some embodiments where non-weight bearing loads or reduced weight is of concern. Variable surface thickness can also be manipulated to shift the center of gravity or strengthen different areas for the parts being produced. Chamber spacing can be uniform or vary to improve or lessen supports in different regions as needed to help support the outer surface structures. The internal chamber structures extending between the outer panel layers or surfaces add reinforcement to both outer panel surfaces, creating an extremely strong structure. As with the surfaces optionally having variable thickness, the vertical chamber supports or ribs between adjacent foam filled chambers can also vary in thickness to provide additional strength or support to the surfaces. Additionally, different materials may be used throughout the structure in some examples, such as lighter and stronger material in some regions and heavier more economical material in other regions of the same structure.

The chambers may be filled with expanding or non-expanding foams such as polyurethane, polystyrene, ethylene vinyl acetate (EVA), or polyethylene foam or the like, and the foam material may be combinations of both expanding and non-expanding foam. The foam or combination of foam materials may be selected to provide light weight, sound proofing, fire retardant, or frequency altering properties in the end product. The materials can be varied as needed depending on the application, to produce various strengths, bending, and surface properties. The foam density and hardness may be varied to change the performance of the structure. The hardness can be used to control the stiffness and compression of each part. Foam density can be varied to control noise frequency from low to high decibels or to control vibration or noise damping as required by the product being manufactured.

This structure and method provides an economical approach in creating various structures for multiple industries, such as aerospace, energy, automotive sporting, construction, and other industrial applications. The technique allows relatively easy construction of complicated variable structures which have high strength to weight ratios and which take into consideration economic factors, weather restrictions, and other challenges faced in making various panel structures. Additionally, sporting paddles manufactured from composite materials with the multi-chamber core construction of this panel structure offer multiple advantages over current sporting paddles which are typically much heavier and produce louder impact sounds on impact with the ball.

Other features and advantages will become more readily apparent to those of ordinary skill in the art after reviewing the following detailed description and the accompanying drawings.

BRIEF DESCRIPTION OF THE DRAWINGS

FIGS. 8A to 8D illustrate steps in a method of making the panel structure of FIGS. 6 and 7;

DETAILED DESCRIPTION

The subject matter described herein is taught by way of example implementations. Various details have been omitted for the sake of clarity and to avoid obscuring the subject matter. The examples shown and described below are directed to foam filled panel structures, various products or articles made using the panel structures, and methods of manufacture of the panel structures and products.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
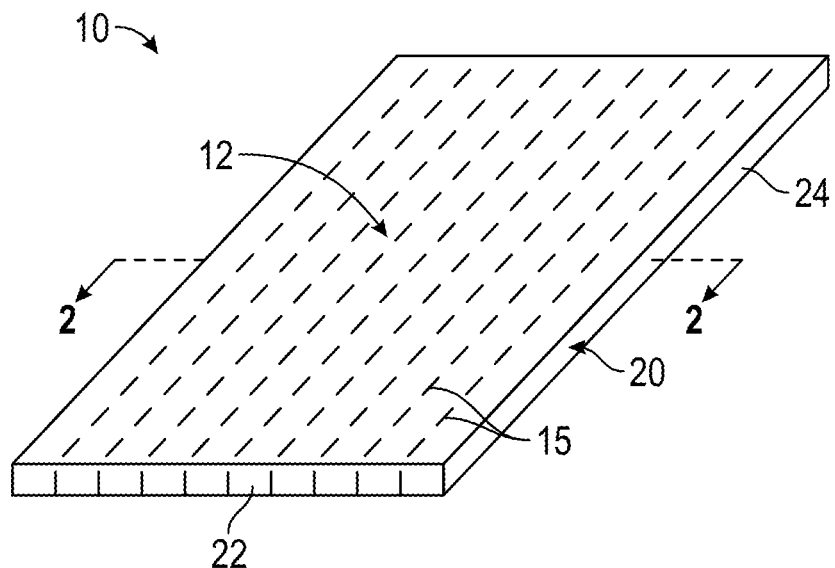
FIG. 1 is a perspective view of one embodiment of a panel structure with dotted lines illustrating the internal ribs separating internal foam-filled chambers.
Figure 2:
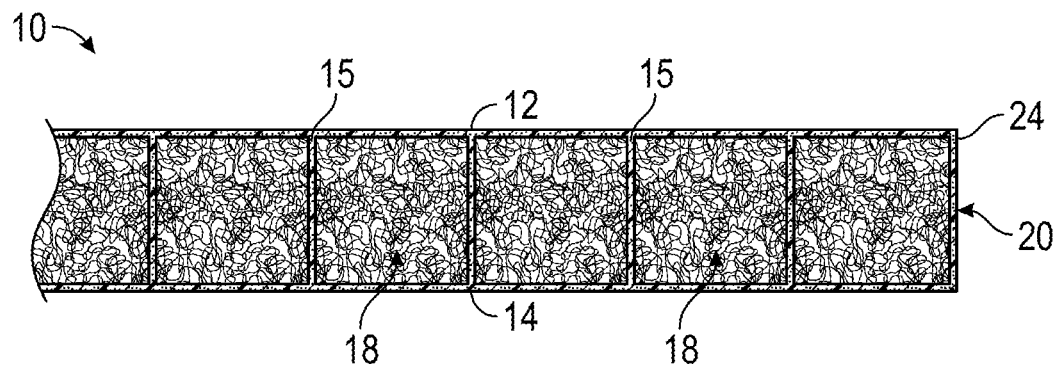
FIG. 2 is an enlarged cross-section through part of the panel structure on the lines 2-2 of FIG. 1.

FIGS. 1 and 2 illustrate a first embodiment of a basic rectangular panel structure 10 which has spaced first and second outer layers 12, 14, each layer having an outer surface and an inner surface facing the other layer, a plurality of spaced, parallel ribs 15 which extend between inner surfaces of the first and second layers and connected to the inner surfaces of those layers to form a plurality of elongate chambers, and a core material or filler 18 filling each chamber. An outer peripheral layer 20 extends around opposite ends 22 and sides 24 of panel structure 10. The core material may be a foam material, gas, or a mixture thereof. In one aspect, the outer layers and inner ribs may be of woven or non-woven composite fiber material comprising fibers impregnated with resins such as epoxy, polyester, or metal matrix resins. This produces a very strong structure of relatively low weight, and is suitable for a wide variety of different applications some of which are described in detail below. The outer layers and ribs may be of the same material or different composite materials. The chambers may be filled with expanding foams or gases, non-expanding foams, or a combination thereof.

Figure 6:
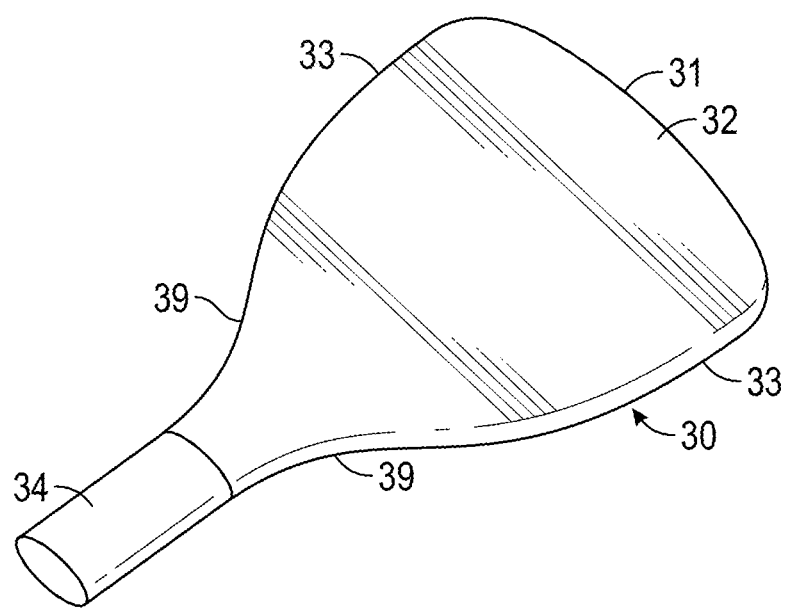
FIG. 6 is a perspective view illustrating a sporting paddle or bat manufactured using the same panel structure as FIG. 1, but formed with a non-rectangular periphery.
Figure 7:
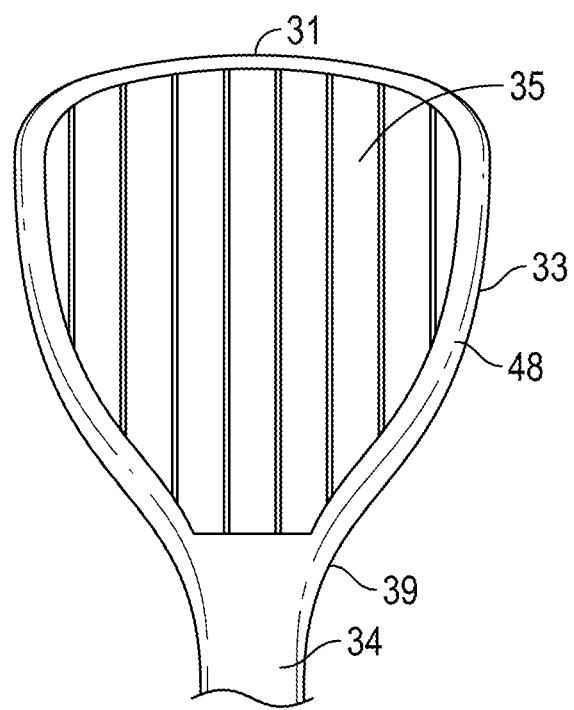
FIG. 7 illustrates the core of the head or hitting part of the paddle prior to application of top and bottom outer layers.
Figure 12:
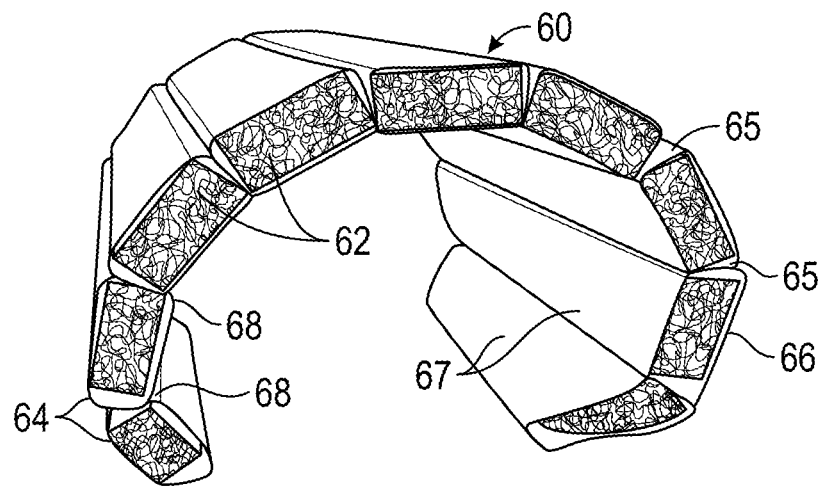
FIGS. 12 and 13 are perspective views illustrating a panel formed into various contoured shapes.
Figure 13:
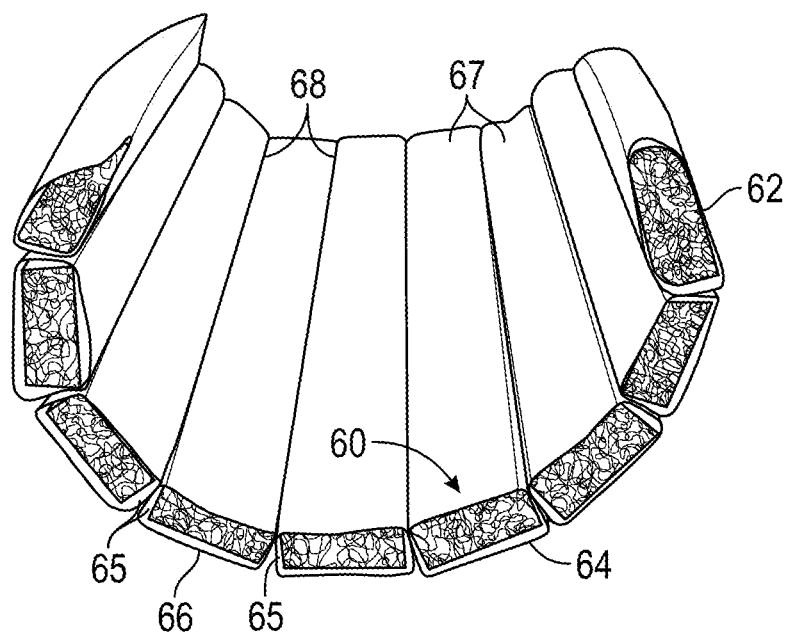
Figure 14:
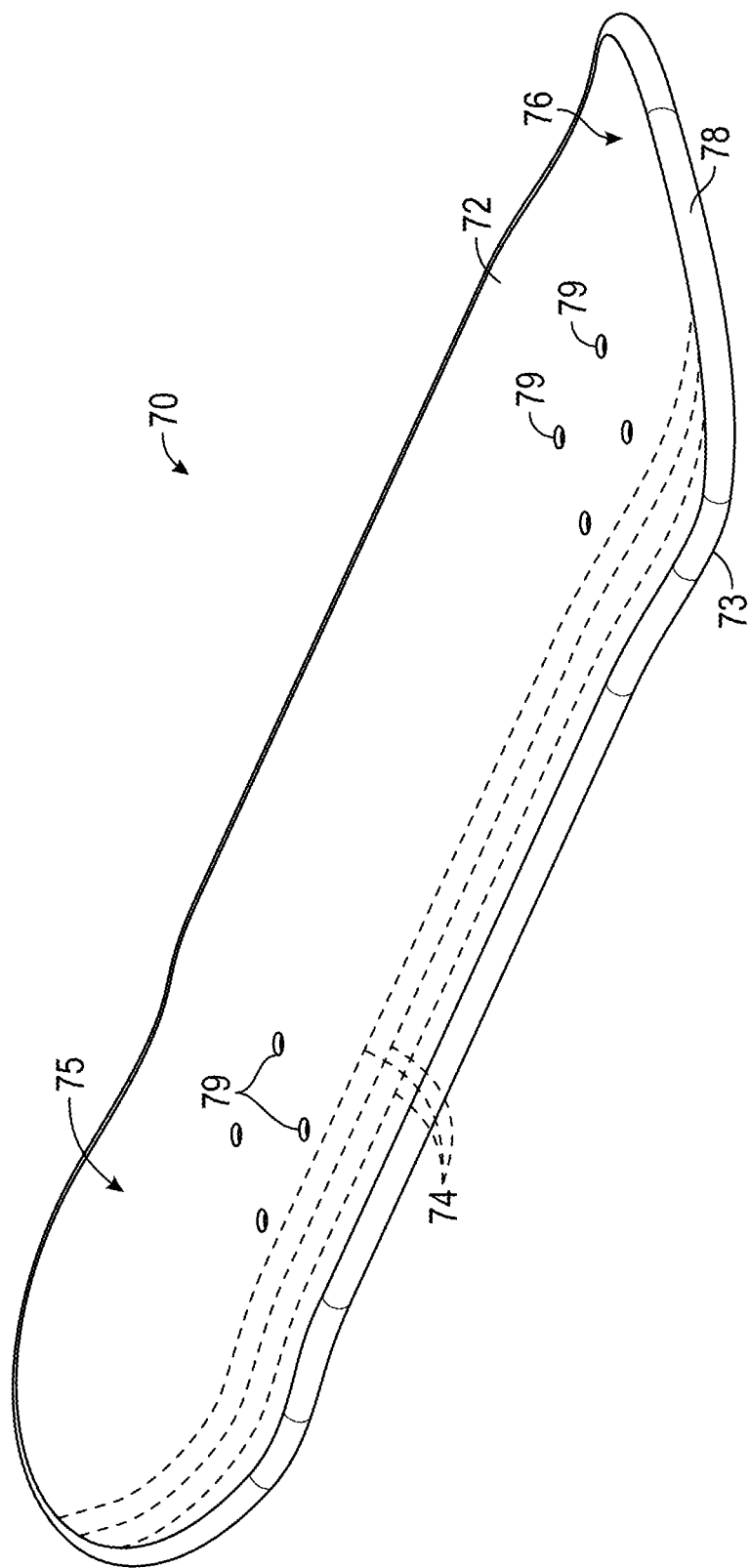
FIG. 14 is a top perspective view illustrating one embodiment of a skateboard manufactured using the basic panel structure method illustrated in FIGS. 8A to 9, adjusted to form the contoured skateboard shape.
Figure 15:
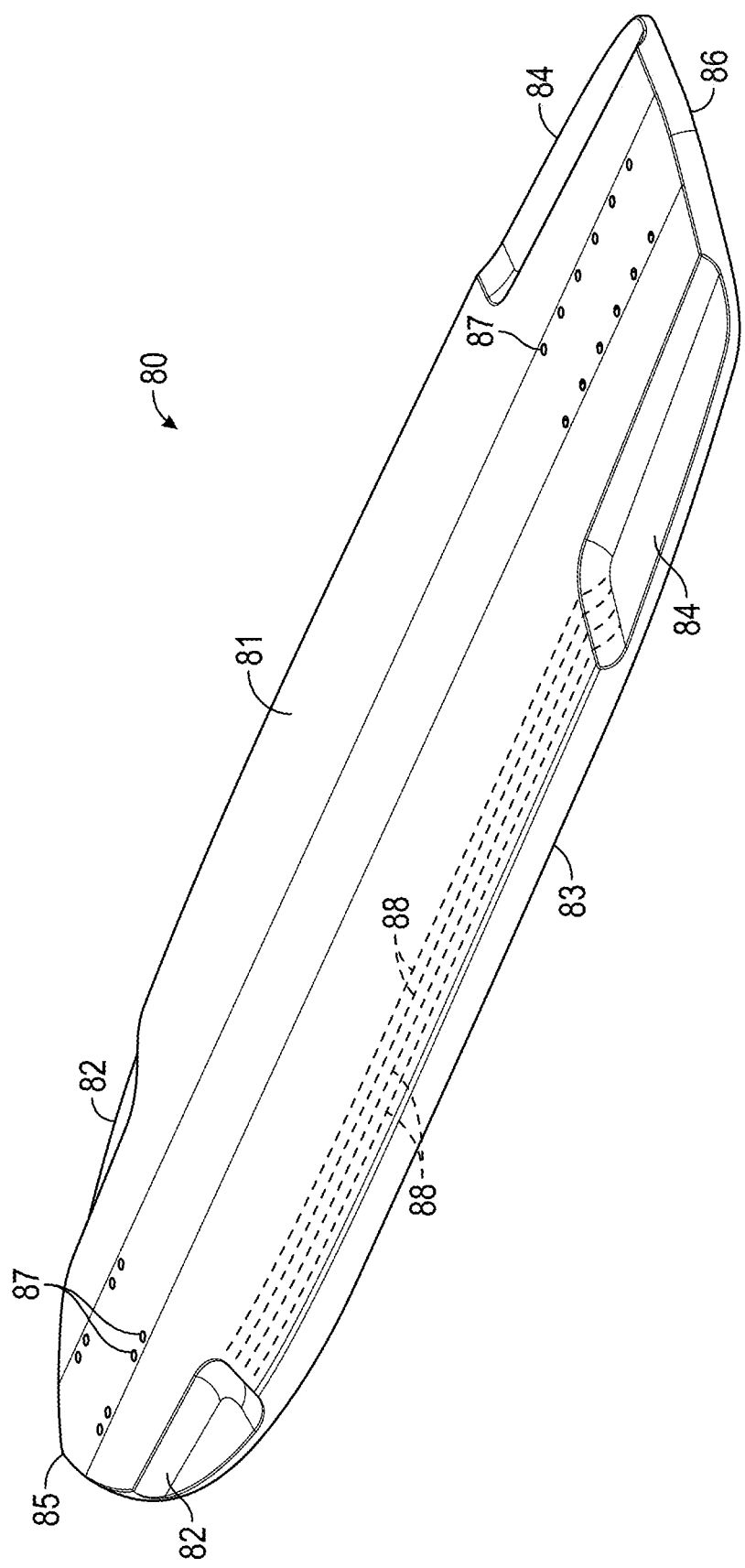
FIG. 15 is a bottom perspective view illustrating one embodiment of a skateboard of the longboard type manufactured using the basic panel structure method illustrated in FIGS. 8A to 9, adjusted to form the contoured skateboard shape.

Panel structure 10 may be made in different size and peripheral shapes, depending on the application, with different numbers and spacing of ribs 15 and thus different numbers of foam-filled chambers. The structure is useful for any application requiring high strength and light weight, such as sports equipment and construction panels of various types. A square or rectangular panel structure may be used in applications requiring high strength and light weight, such as wall panels, barriers, display panels, walls for a ball game court system (e.g squash or racquetball court), or a divider system, or in various other panel applications. The outer layers may be flat as illustrated, or may be of various shapes and contours in alternative embodiments, for use in applications ranging from manufacture of sports products to panels for use in construction, furniture, room dividers, displays, vehicles and the like. The periphery may be of various shapes, for example a sports paddle shape as illustrated in FIGS. 6 and 7, an arcuate shape as illustrated in FIGS. 12 and 13, or skateboard shapes as illustrated in FIGS. 14 and 15, as described in more detail below. Possible applications of the panel structure include solid sporting paddles or bats as used for pickle ball, paddleball, table tennis, beach paddle, padel, cricket, and other surface paddle games, and other types of sports equipment including surfboards, kite boards, skateboards, wakeboards, skis, and the like, as well as wall panels, dividers, display panels, panels for use in automobile, aerospace, and boat manufacture, and other industrial applications. The panel structure is designed with a high strength to weight ratio and is more lightweight than prior composite wall panels or sporting paddles. Suitable foam materials are lightweight closed cell plastic foams such as polyurethane foams, expanded polystyrene foams, EVA foams, polyethylene foams and the like which are light weight but strong.

Figure 3:
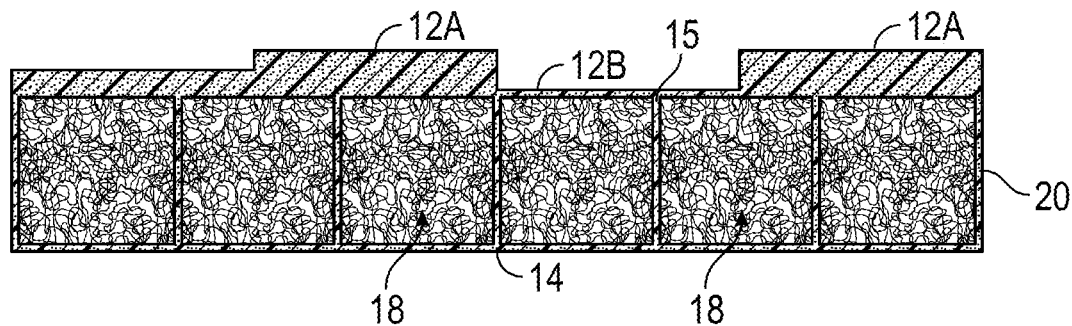
FIGS. 3 to 5 illustrate various modifications of the structure of FIG. 2 for adding surface thickness, varying rib thickness, and varying chamber size to provide more or less strength in various areas of the panel structure, depending on the application.

FIG. 2 is a cross-sectional view through part of panel structure 10 in one embodiment. In this embodiment, the panel structure has a uniform surface thickness, chamber size, and rib spacing and thickness. As illustrated, the upper and lower layers 12 and 14 and the ribs 15 together form elongate chambers of rectangular cross section which are filled with foam cores 18. As illustrated in FIG. 3, the thickness of one or both surface layers 12 and 14 may be variable, with thicker regions 12A and thinner regions 12B, so as to shift the center of gravity, strengthen different areas, or provide recesses or other contours in a panel surface, depending on the article or part being manufactured. The surface layer may also be formed with contoured or curved regions.

Figure 4:
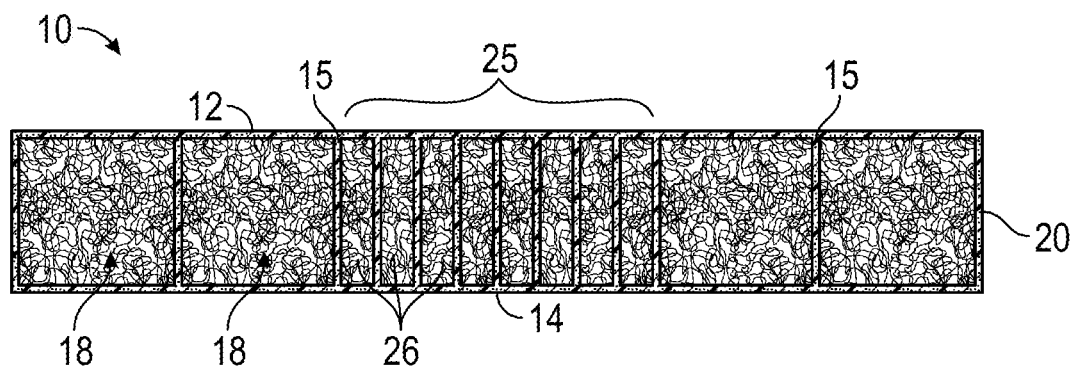

The rib spacing and chamber size may be uniform, as illustrated in FIGS. 2 and 3, or vary to increase or lessen support in different areas, as illustrated in FIG. 4, where the rib spacing is decreased in region 25 to produce smaller foam-filled chambers 26 with increased support for the face layers in regions that are more likely to strike a ball, for example, in a sporting bat or paddle, or provide increased support in certain areas of structural panels for construction and the like.

Figure 5:
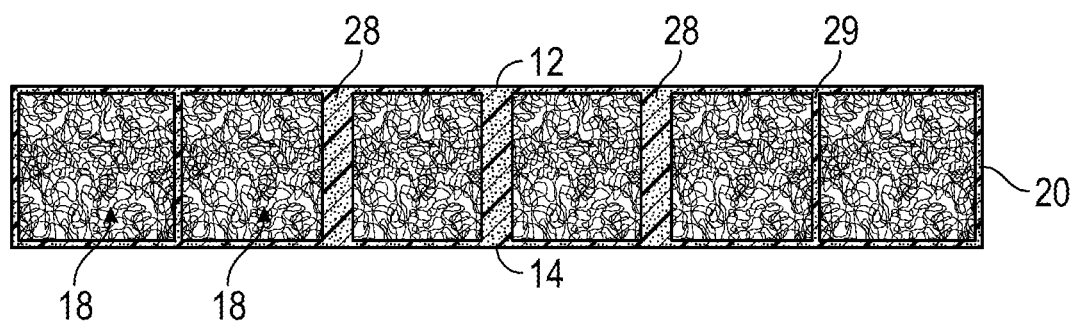

As illustrated in FIG. 5, the chamber wall thickness may vary, with thicker walls 28 in some regions and thinner walls 29 in other regions, as compared to the uniform wall thickness shown in FIGS. 2 to 4. Thicker walls or ribs 28 improve compression strength while thinner walls 29 reduce weight, depending on the article being made with the panel.

Figure 9:
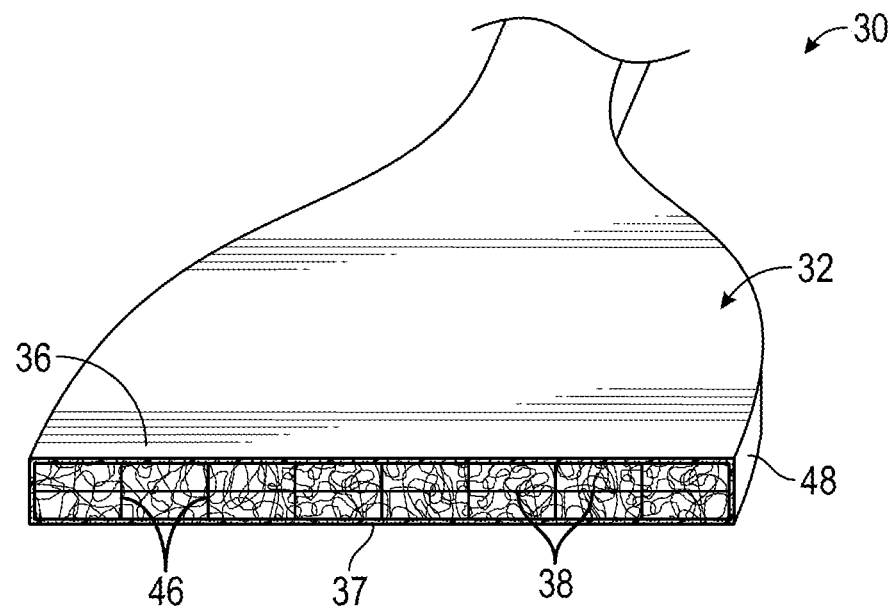
FIG. 9 is a cut away view of the finished paddle to illustrate the inner core-filled chamber structure.

FIG. 6 illustrates a paddle 30 of the type used for various ball sports, having a head 32 and contoured handle 34. In the illustrated embodiment, the paddle is a pickle ball paddle, but a similar structure may be used to make other paddles of different sizes and shapes, such as table tennis paddles, padels, beach paddles, paddleball paddles, and the like. The head 30 of the paddle has a contoured peripheral shape having slightly curved outer end 31, opposite sides 33, and inwardly curved edge portions 39 extending smoothly into handle 34. FIG. 6 illustrates the finished paddle, while FIG. 7 illustrates an inner core structure 35 of the paddle prior to application of the outer layers 36, 37 forming opposite flat faces of the paddle, as illustrated in FIG. 9, where half of the paddle head is cut away to reveal the internal structure between layers 36 and 37.

Figure 8D:
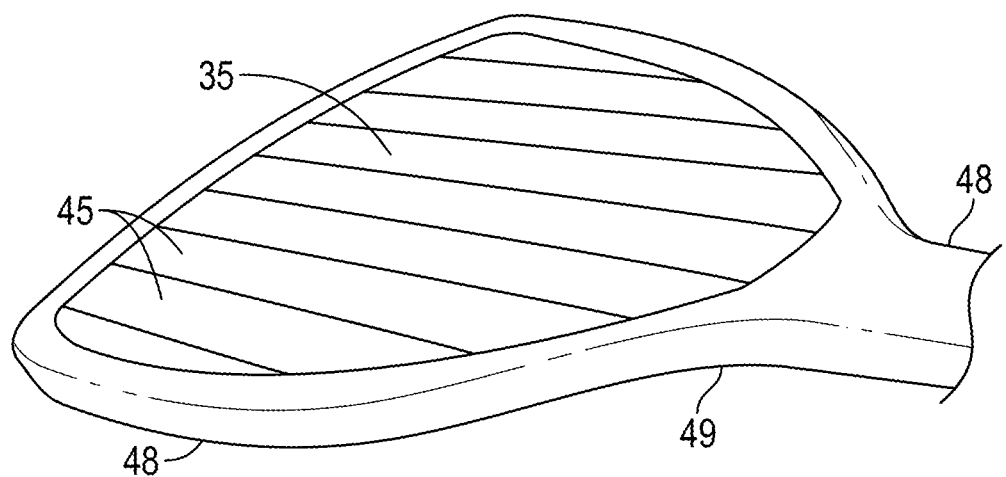

FIGS. 8A to 8D illustrate steps in manufacture of paddle 30, but the same basic steps may be used to manufacture other articles or parts of different shapes and sizes, with appropriate adjustment of core size and shape. The process begins by creating a desired core structure of desired thickness and peripheral shape, starting with a plurality of foam cores or pieces 38 of either expanding or non-expanding foam material, or a mixture of both expanding and non-expanding foam. The individual foam pieces 36 are cut from a large piece of foam material of selected thickness to appropriate lengths and end edge shapes which correspond to the shape and dimension of the panel to be formed, as well as the desired core width and rib thickness between foam chambers. FIG. 8A illustrates foam pieces 38 cut to form the shape of foam cores for filling side by side chambers of paddle head 32. A suitable pattern may be used for cutting the foam cores, and the periphery may be cut out first, followed by parallel cuts to separate the foam cores or core pieces 38. As illustrated, each piece of foam apart from outer side cores 38A is of rectangular or square cross section and of a length depending on its position in head 32, and has rounded or tapered ends 40 designed to follow the general contour of paddle head 32 along outer end 31 and sides 33, 39, with the foam cores running in a longitudinal direction parallel with the handle axis. The cross-sectional shape may vary in other embodiments to produce selected surface contours. Outer side foam pieces 38A have contoured edges 41 forming parts of the outer side edges 33 of the paddle. In the illustrated embodiment, the foam material used for the chamber cores is a foam sandwich structure with hard foam upper and lower layers and an expanding layer 44 between layers 42 to provide additional pressure when molding the part, but core pieces 38 and 38A may be formed from a single piece of uniform foam material in other embodiments, depending on the application. In an alternative embodiment, the cores 38 may extend perpendicular to the direction shown, i.e. perpendicular to the handle axis.

Each cut foam piece 38 is held as indicated in FIG. 8B by a suitable tool (not illustrated) and encapsulated or wrapped with fibrous material or fibers 43 to form the chamber walls and the ribs of the internal structure, leaving only the end faces of the foam core pieces exposed (see FIG. 8C). The fibrous material may be carbon fiber, glass fiber, graphite, boron, para-aramid synthetic fiber (KEVLAR®), carbon, or other fibrous materials, or mixtures thereof. Multiple different fibers may be used in the fibrous material in some embodiments. The fibrous materials may be impregnated with epoxy or thermos set resin material such as epoxy, polyester, polyurethane ketone (PEEK), or metal matrix resins either before (pre-preg) or after wrapping the fibrous material or fibers around the individual foam core pieces. Once wrapped, the individual cores are connected or bonded to one another to create the building blocks for multiple chambers. In this step, the individually wrapped foam pieces 45 are placed side-by-side as indicated in FIG. 8C, and joined together to form a base or core structure 35, with vertical walls or ribs 46 between each foam core 38 formed by the bonded side portions of fibrous material wrapped around each core. This also forms the ribs integrally with part of the outer layers of the paddle, integrating the chamber walls and outer layers into a strong, unitary structure. Handle 34 may be formed in a similar manner to paddle head 32 in one example, using one or more foam cores wrapped in fibrous material and running along the handle, and may be an extension of the central foam chamber or chambers forming the paddle head. Alternatively, a hollow handle that is connected to the paddle head may be formed using a bladder molding process in the handle area while constructing the paddle, so that the handle is constructed as part of the paddle head.

Once the chambers are connected and in place, a skin structure is applied to cover the core structure and create a "pre-shape" structure. First, the handle and the outer peripheral edge of the paddle head are wrapped with fibrous material forming the periphery 48 of the structure, as in FIGS. 7 and 8D, and upper and lower layers 36 and 37 of the same material are then applied over the opposite faces of the core, creating the skin of the structure (FIG. 9). Additional material 49 may be applied where the paddle head joins to the handle to build the handle shape. This structure is placed into a cavity mold or bagged for a vacuum molding process to mold the resin and fibrous materials together. When the structure is placed in the mold or is bagged for vacuum, the internal foam or gases simultaneously expand throughout the structure providing a uniform pressure, allowing the chamber wall materials to integrate with the outside skin material and cure at the same time. This helps create uniformity in each chamber of each dimensional cell and allows for the entire structure to expand at a very uniform rate. Heat is then applied to the structure to cure the thermoset resin, forming the skin and internal walls. Once cured, the structure becomes a single unitary structure with internal walls connecting the outer layers and sharing the load to provide a very strong but lightweight product. The finished, hardened part is then extracted from the mold.

One advantage with the method described above is that material can be added at various locations on the paddle to change weight distribution along the x and y axis, and to increase or decrease overall weight. The foam material can also be varied to provide various dampening characteristics for sound waves and vibration.

The wall or construction panel of FIGS. 1 and 2 is made in a similar manner to the paddle as described above, but the method is simpler since the foam core has a regular rectangular shape, i.e. the foam pieces are of uniform shape and size, and a handle or other part does not have to be formed with the panel. Parts of many other shapes and sizes can be manufactured in a similar fashion.

Figure 10:
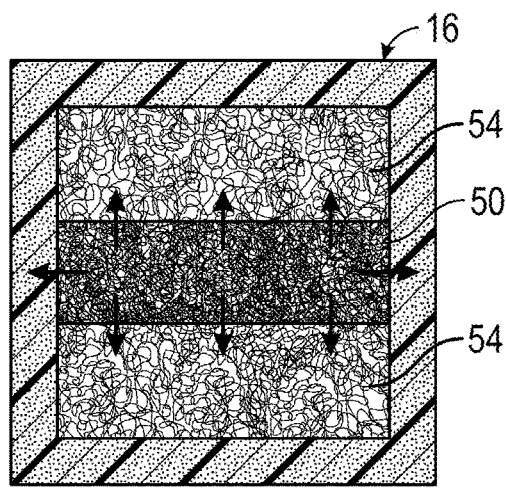
FIG. 10 is a transverse cross-section through a finished chamber in one embodiment of the panel structure of FIG. 1 or 6 in which the chambers are filled with high expansion foam.

In one embodiment, the chambers of the panel structure may be filled with expanding foam or non-expanding foam, or both. FIG. 10 illustrates a cross sectional view through one chamber 16 of an embodiment of a panel containing high expansion foam material 50 at the center, between foam layers 54. On heating or curing, foam material 54 expands as indicated by the arrows.

Figures 11A, 11B:
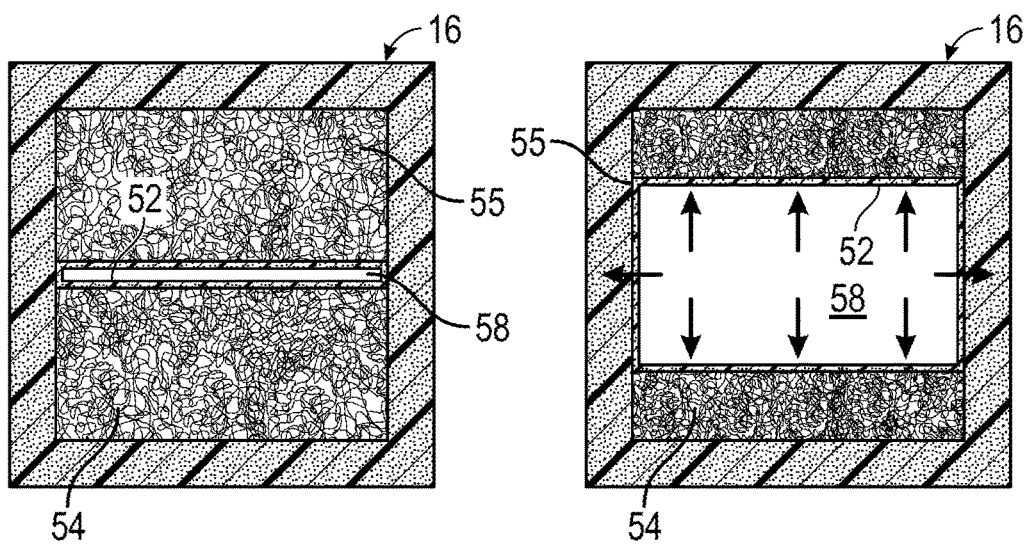
FIGS. 11A to 11C illustrate an embodiment in which the chambers contain a bladder sandwiched between foam layers, illustrating steps in manufacturing a panel in which the bladder chambers are expanded to apply pressure to the wall surfaces prior to release of pressure.
Figure 11C:
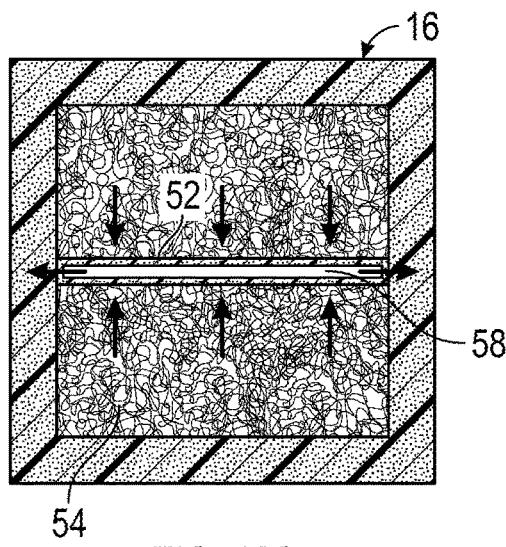

FIGS. 11A to 11O illustrate the use of internal bladder molding with foam material. As illustrated in FIG. 11A, a bladder 52 is sandwiched between foam layers 54 in a chamber or cavity 55 inside a cavity mold, with a chamber 58 inside bladder 52. Air pressure is increased inside the bladder as indicated by the arrows in FIG. 11B, increasing the size of the chambers 58 and producing internal pressure inside each cavity 55, resulting in high pressure on the outer surfaces or layers covering the foam filled chamber structure. Once the structure is cured, pressure is released and the foam then returns to its original shape, creating a softer inner fill area, as illustrated in FIG. 11C.

The foam density and hardness may be selected depending on the desired performance of the structure, with hardness used to control the stiffness and compressibility of each part. The foam density can also be varied for noise dampening or noise frequency. The type of foam can also be varied depending on desired noise dampening properties, for example in wall, ceiling, or floor panels. The foam may contain fire retardant chemicals.

FIGS. 12 and 13 illustrate a method of contouring a panel structure 60 into different, non-flat shapes. The panel structure in this embodiment is formed in a similar manner to that described above, with plural elongate foam cores 62 first cut to the desired length and width, and then wrapped with composite fibers impregnated with a suitable resin material 64 forming a skin, such as epoxy. This forms the side walls 65 and outer walls 66, 67 of each core. The wrapped foam cores are then secured together along adjacent edges of only one outer wall forming pivot joints 68 between adjacent pairs of wrapped cores and bent to form a desired contour or arcuate shape, and an outer skin is then formed around the resultant core structure in the manner described above, before placing in a mold, curing and applying heat, as described above in connection with the paddle.

FIG. 14 is a perspective view illustrating one embodiment of a skateboard deck 70 ("street" deck) which may be made using the panel structure with expanding and non-expanding foam-filled internal chambers or cores as described above. The deck 70 may be manufactured in a similar manner to the paddle of FIGS. 6 to 9, with upper and lower layers 72, 73 of the panel secured together by a series of spaced, parallel ribs 74 extending lengthwise along the board as illustrated in dotted outline, and with foam material filling the elongate chambers or channels between adjacent ribs. The internal ribs and foam cores span the entire width and length of the board. The nose 75 and tail 76 of skateboard deck 70 are curved slightly upwards. In one embodiment, the contoured skateboard shape may be formed by suitably shaping a piece of foam to form the desired upper and lower surface contour, cutting the piece of foam to form separate, elongate foam cores, and cutting the desired peripheral shape with the cores positioned side-by-side, prior to wrapping with fibers or fibrous material and molding or bonding. Alternatively, the desired surface contour may be formed by suitable variation in the thickness of the upper and lower surface layers. An upper layer and lower layer are applied to the wrapped cores, and a peripheral layer 78 of the same fibrous material is also attached around the periphery of the skateboard as indicated. Skateboard truck or wheel mounting holes 79 are cut through the board when construction is completed. A similar technique may be used for construction of other sports equipment which has similar curved surfaces, such as skis, snowboards, surfboards, paddle boards, wake boards, and the like.

FIG. 15 illustrates one embodiment of a longer skateboard deck or longboard 80 which may be manufactured using the methods described above. The lower surface or layer 81 of the board has indented regions 82, 84 at the nose and tail ends 85, 86, respectively. These are designed to form wheel wells adjacent the truck mounting holes 87. Longboard deck 80 may be manufactured in a similar manner to the paddle of FIGS. 6 to 9, with suitable adjustment of the peripheral shape and dimensions. Upper and lower layers 83, 81 of the panel are secured together by a series of spaced, parallel ribs 88 extending lengthwise along the board, some of which are illustrated in dotted outline, and with foam material filling the elongate chambers or channels between adjacent ribs as described above. The ribs and foam channels span the entire length and width of the board. The board thickness is controlled by rib height and upper and lower layer thickness. Recesses 82, 84 may be formed by adjusting the height of the product in the designated areas, for example by decreasing the thickness of the lower layer 81 in those regions, in the manner generally illustrated in FIG. 3. In this case, the thickness of lower layer 81 is reduced in the recessed regions to form indents 82 and 84 in the same manner as region 12B in FIG. 3. Alternatively, core and rib height may be reduced to define these regions prior to application of the outer layers.

Panel structures such as sporting equipment including paddles, boards and the like as well as wall, floor or ceiling panels, barriers, and the like with a multi-chamber construction as described above offer multiple advantages over panel structures and processes used in today's industry to manufacture such parts. The composite panel with outer surface layers interconnected with multiple spaced parallel ribs and foam cores filling elongate chambers formed between the fibrous material ribs and surface layers is very strong but lightweight and economical to manufacture. Panel structures or materials formed as described above can be readily customized for different applications, for example sporting devices, construction, aerospace, energy, automotive, marine, furniture, and other applications. The structures can be readily modified to include sound proofing, fire retardant, or other properties, to add increased strength in some areas subject to more impact force or weight bearing, and to produce flat or contoured panel structures of various peripheral shapes or sizes.

The foregoing systems and methods and associated devices and modules are susceptible to many variations. Additionally, for clarity and concision, many descriptions of the systems and methods have been simplified.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A skateboard deck, comprising:
a panel having upper and lower faces, opposite side edges, a nose end, a tail end, and an at least partially rounded peripheral edge;
the panel comprising spaced upper and lower layers forming the upper and lower faces of the panel, each layer having an outer surface and an inner surface, a plurality of spaced parallel ribs extending between the inner surfaces of the upper and lower layers and defining a plurality of elongate chambers between each adjacent pair of ribs, and a foam core fills each elongate chamber;
wherein the ribs integrate with the spaced upper and lower layers to form a unitary structure, and the ribs and foam cores extend the entire length of the panel and are disposed throughout the entire width of the panel width.

2. The skateboard deck of claim 1, wherein the ribs and foam cores extend parallel to each other from the nose end to the tail end.

3. The skateboard deck of claim 1, wherein the nose end and the tail end of the panel curve upwards.

4. The skateboard deck of claim 3, wherein the lower face of the panel has indented regions of predetermined shape and size on opposite sides adjacent the nose and tail ends, the indented regions comprising wheel wells.

5. The skateboard deck of claim 4, wherein the wheel wells are formed by reducing the thickness of the lower layer in the indented regions.

6. The skateboard deck of claim 1, wherein the plurality of spaced parallel ribs extend longitudinally from the nose end to the tail end, connect to and extend between the inner surfaces of the upper and lower layers, and define the plurality of elongate chambers between each adjacent pair of ribs, the inner surfaces of the upper and lower layers between adjacent ribs and opposing surfaces of adjacent parallel ribs form wall surfaces of each elongate chamber; in a cross-sectional view of the panel, the ribs each have a height between opposing inner surfaces of the layers, adjacent consecutive ribs in a central area inside the opposite side edges of the panel have a first thickness in a direction transverse to the height of the ribs, and ribs in an area outside the central area and inside the opposite side edges have a second thickness in a direction transverse to the height of the ribs which is less than or greater than the first transverse thickness; and
the foam core fills each elongate chamber.

7. The skateboard deck of claim 6, wherein the ribs and chambers fill the entire space between the layers up to the opposite side edges.

8. The skateboard deck of claim 6, wherein the foam core is selected from the group consisting of polyurethane foam, polystyrene foam, ethylene vinyl acetate (EVA) foam, and polyethylene foam materials.

9. The skateboard deck of claim 6, wherein the panel is flat.

10. The skateboard deck of claim 6, wherein the upper and lower layers, the ribs, and the opposite side edges are each formed of a composite fiber material.

11. The skateboard deck of claim 6, wherein the foam core comprises a first outer foam layer, a second outer foam layer, and a central foam layer of expanded foam material between the first outer foam layer and the second outer foam layer.

12. The skateboard deck of claim 1, wherein the upper and lower layers and the ribs are formed of a woven or a non-woven fibrous material impregnated with a resin material.

13. The skateboard deck of claim 1, wherein the foam core filling each elongate chamber comprises outer foam layers and a bladder chamber between the outer foam layers.

14. The skateboard deck of claim 1, wherein the plurality of spaced parallel ribs extend longitudinally from the nose end to the tail end, connect to and extend between the inner surfaces of the upper and lower layers, and define the plurality of elongate chambers between each adjacent pair of ribs, the inner surfaces of the upper and lower layers and opposing inner transverse surfaces of adjacent parallel ribs form wall surfaces of each elongate chamber;
the foam core fills each elongate chamber;
in a cross-sectional view of the panel, the ribs each have a height between opposing inner surfaces of the layers, adjacent consecutive ribs in a central area inside the opposite side edges of the panel have a first thickness in a direction transverse to the height of the ribs, and ribs in an area outside the central area and inside the opposite side edges have a second thickness in a direction transverse to the height of the ribs which is less than the first transverse thickness; and
the elongate chambers of the central area include a second width, and the adjacent elongate chambers of the area outside the central area and inside the opposite side edges include a first width that is greater than the second width.

15. The skateboard deck of claim 1, wherein the foam cores include foam layers and an expandable bladder sandwiched between the foam layers.

16. The skateboard deck of claim 1, wherein the foam core is made of foam material that expands when heated.

17. The skateboard deck of claim 1, wherein the upper and lower layers and the ribs are formed of a carbon fiber material.

18. The skateboard deck of claim 1, wherein adjacent consecutive ribs in a central area inside the opposite side edges of the panel have a first lateral spacing in a direction transverse to the height of the ribs, and ribs in an area outside the central area and inside the opposite side edges have a second lateral spacing in a direction transverse to the height of the ribs which is greater than the first lateral spacing.

* * * * *